(12) United States Patent
Boyd et al.

(10) Patent No.: US 7,990,540 B2
(45) Date of Patent: Aug. 2, 2011

(54) APPARATUS AND METHODS USING HIGHLY OPTICALLY DISPERSIVE MEDIA

(75) Inventors: Robert W. Boyd, Webster, NY (US);
Daniel J. Gauthier, Durham, NC (US);
Zhimin Shi, Rochester, NY (US)

(73) Assignees: University of Rochester, Rochester, NY (US); Duke University, Durham, NC (US)

( * ) Notice: Subject to any disclaimer, the term of this patent is extended or adjusted under 35 U.S.C. 154(b) by 250 days.

(21) Appl. No.: 12/209,353

(22) Filed: Sep. 12, 2008

(65) Prior Publication Data
US 2009/0073450 A1 Mar. 19, 2009

Related U.S. Application Data

(60) Provisional application No. 60/972,347, filed on Sep. 14, 2007, provisional application No. 60/972,352, filed on Sep. 14, 2007.

(51) Int. Cl.
*G01B 9/02* (2006.01)
(52) U.S. Cl. ...................................... 356/451; 356/454
(58) Field of Classification Search .................. 356/451, 356/452, 456, 454
See application file for complete search history.

(56) References Cited

U.S. PATENT DOCUMENTS

2006/0055935 A1* 3/2006 Cheben et al. ............... 356/451
2006/0164648 A1* 7/2006 Howard ........................ 356/450

OTHER PUBLICATIONS

Shi, Zhimin et al. "Enhancing the spectral sensitivity of interferometers using slow-light media". Optics Letters, vol. 32, No. 8, Apr. 15, 2007, pp. 915-917.*
Boyd, Robert W and Gauthier Daniel J.; "Slow" and "Fast" Light; The Institute of Optics; University of Rochester; Department of Physics, Duke University; Sep. 24, 2001.

* cited by examiner

*Primary Examiner* — Michael A Lyons
(74) *Attorney, Agent, or Firm* — William J. Greener; Bond, Schoeneck & King, PLLC

(57) ABSTRACT

According to the invention, a highly optically dispersive medium is one in which the absolute value of the group index of refraction of the medium is equal to or greater than four. An optical spectroscopic parameter detection and/or measurement apparatus may be in the form of an interferometer, a spectral interferometer, a spectrometer, a wavemeter, a tunable narrowband filter The embodied devices include a highly dispersive medium that appropriately can facilitate either a slow-light effect or a fast-light effect, which is disposed in a propagation path of an electro-magnetic (EM) input field and, a detector disposed in a manner to detect an output field resulting from the input filed interaction with the highly dispersive medium. Methods involve measuring a spectroscopic parameter using an optical spectroscopic parameter detection and/or measurement apparatus that incorporates a highly dispersive medium.

49 Claims, 10 Drawing Sheets

APPARATUS AND METHODS USING HIGHLY OPTICALLY DISPERSIVE MEDIA

RELATED APPLICATION DATA

This application claims priority to U.S. provisional application Ser. No. 60/972,347 entitled Slow-Light Fourier Transform Interferometric Apparatus and Methods filed on Sep. 14, 2007 and to U.S. provisional application Ser. No. 60/972,352 entitled Fast-Light and Slow-Light-Based Interferometric Apparatus and Methods filed on Sep. 14, 2007, the subject matters of which are incorporated herein by reference in their entireties.

FEDERALLY SPONSORED RESEARCH

This invention was made with government support under Agreement Nos. N00014-05-1-0053 and ECS0701585 sponsored by the Office of Naval Research and The National Science Foundation, respectively. The government may have certain rights in the invention.

BACKGROUND

1. Field of the Invention

Embodiments of the invention are most generally related to the field of optical phenomena in highly dispersive optical media, such phenomena being referred to herein as slow-light and fast-light optical phenomena. More particularly, embodiments of the invention are directed to fast- and slow-light-based optical interferometric, spectroscopic, and combined interferometric/spectroscopic apparatus and associated methods that provide improved measurement capabilities.

2. Background Discussion

The observation of optical interference phenomena can be traced back at least to the mid $17^{th}$ century shortly before Huygens proposed his wave theory of light. Since then, many basic types of interferometers have been developed (e.g., two-beam, multiple-beam, grating-based, as well as others well known in the art) and their performance and scope of applications have continued to improve and grow, respectively.

Spectral sensitivity and spectral resolving power are two exemplary metrics of the performance of an interferometer, and are particularly significant performance metrics for a spectroscopic interferometer. Both spectral sensitivity and spectral resolving power are known to depend on the length, L, and the (phase) index of refraction, n, of the medium that a beam of light propagates through in an interferometer. These quantities affect the phase difference, $\Delta\phi$, between a reference optical path and a measurement optical path having different L, n values. The phase difference affects the measurable intensity of the output signal(s) from the interferometer, which, in turn, directly impacts the measurement of various spectral parameters of the input optical field such as determined by spectral sensitivity and resolving power.

A more recent development in the field of optics involves the discovery and applications of what is known as slow-light and fast-light phenomena. The interested reader is directed to R. W. Boyd and D. J. Gauthier, in *Progress in Optics*, E. Wolf, ed. (Elsevier, 2002), Vol. 43, pp. 497-530, the subject matter of which is incorporated herein by reference in its entirety to the fullest allowable extent.

Briefly, there is a well understood distinction between the phase velocity, $v_p$, and the group velocity, $v_g$, of a light field. The group velocity gives the velocity with which a pulse of light propagates through a material system. "Fast" or "slow" light depends on the value of the group velocity $v_g$ in comparison to the velocity of light c in a vacuum. "Slow" light refers to the situation $v_g \ll c$. "Fast" light refers to light traveling faster then the speed of light in a vacuum. This circumstance can occur either when $v_g > c$ or when $v_g$ is negative. A negative group velocity corresponds to the case when the peak of the pulse transmitted through an optical material emerges before the peak of the incident light field enters the medium.

For a monochromatic plane wave of angular frequency $\omega$ propagating through a medium of refractive index n, the wave can be described by the equation $$E(z,t)=Ae^{i(kz-\omega t)}+C$$

where $k=n\omega/c$. The phase velocity $v_p$ is defined as the velocity at which points of constant phase move through the medium. The phase of this wave is given by $$\phi=kz-\omega t,$$

therefore, points of constant phase move a distance $\Delta z$ in a time $\Delta t$, which are related by $$k\Delta z=\omega\Delta t.$$

Thus $v_p=\Delta z/\Delta t$ or $$v_p=\omega/k=c/n.$$

One can next consider the propagation of a pulse through a material system. A pulse is necessarily composed of a spread of optical frequencies. At the peak of the pulse, the various frequency components will tend to add up in phase. If this pulse is to propagate without distortion, these components must add in phase for all values of the propagation distance z. To express this concept mathematically, one may write the phase of the wave as $$\phi=(n\omega z/c)-\omega t$$

and require that there be no change in $\phi$ to first order in $\omega$. That is, $d\phi/d\omega=0$ or $$(dn/d\omega)(\omega z/c)+(nz/c)-t=0,$$

which can be written as $z=v_g t$, where the group velocity is given by $$v_g=c/(n+\omega dn/d\omega)=d\omega/dk.$$

The last equality in this equation results from the use of the relation $k=n\omega/c$. Alternatively, we can express this result in terms of a group refraction index $n_g$ defined by $$v_g=c/n_g$$

with $$n_g=n+\omega dn/d\omega.$$

One can see that the group index differs from the phase index by a term that depends on the dispersion $dn/d\omega$ of the refractive index.

Slow- and fast-light effects invariably make use of the rapid variation of refractive index that occurs in the vicinity of a material resonance. Slow-light can be achieved by making $dn/d\omega$ large and positive (i.e., large normal dispersion), and fast-light occurs when the value of $dn/d\omega$ is made large and negative (i.e., large anomalous dispersion).

Slow- and fast-light technology has recently attracted a great deal of interest, both in terms of fundamental and practical aspects. A potential application of slow light is in optical communications, where a tunable delay element can be used for all-optical buffering, data-synchronization, jitter correction, etc. One primary figure of merit of a slow-light delay element is the maximum fractional delay (also known as the delay-bandwidth product). This figure of merit is often limited by the maximum change in signal power level and the signal distortion that a practical system can tolerate.

In view of the foregoing concepts, information, and associated knowledge, the inventors have discovered new and useful apparatus and methods directed to spectral interferometers, spectrometers, and related apparatus, the spectral performance thereof, and the measurements made therewith. In particular, the inventors have recognized that numerous advantages would be associated with, e.g., a spectral interferometer and spectral interferometric methods having one or more of the following attributes: significantly increased spectral resolution for a conventionally-sized device, improved spectral sensitivity, at least conventional device performance in a significantly smaller-than-conventional device including chip-mounted devices (e.g., spectrometer-on-a-chip), improved reliability, reduced cost, more efficient operation, and more architecture adaptability and application suitability than provided by conventional devices.

SUMMARY OF CERTAIN DESCRIPTIVE, ILLUSTRATIVE, AND EXEMPLARY EMBODIMENTS

As used herein, the term "highly dispersive medium", which facilitates the generation of 'fast'- or 'slow'-light, will refer to an optical medium in which the absolute value of the group index of refraction, $|n_g|$, is equal to or greater than four (4) and provided that $n_g \neq$ zero (0). As used herein, the term 'spectroscopic parameter' will refer to a wavelength- and/or frequency-based parameter of an EM input field including, but not limited to, both spectral resolution and spectral bandwidth, or to a metric indicative of a desired spectroscopic parameter.

Certain exemplary figures of merit will be used herein below to evaluate the spectral performance of an interferometer. One exemplary figure of merit will be the spectral resolution, $\delta v_{min}$, which describes the minimum frequency difference that a spectroscopic interferometer can resolve. This quantity also describes how sensitive an interferometer is to the change of the input frequency when it is used as a frequency monitor or sensor.

An important quantity, which will be referred to herein as the 'working bandwidth', $\Delta v_w$, describes the maximum usable spectral bandwidth of an interferometer. The working bandwidth can be limited both by the dispersive properties of the slow-light medium and by the construction of the interferometer itself; however, the dispersive properties of the medium typically present the primary limitation for a practical slow-light interferometer. In conjunction with the working bandwidth and certain constraints discussed in greater detail below, another figure of merit will be described as the working finesse, $F_w$, defined as the ratio of the working bandwidth to the spectral resolution, $\Delta v_w / \delta v_{min}$.

An embodiment of the invention is an optical spectroscopic parameter detection and/or measurement apparatus. In various non-limiting aspects, the apparatus may be in the form of an interferometer, a spectral interferometer, a spectrometer, a wavemeter, a tunable narrowband filter, and other such devices as one skilled in the art would understand. Various non-limiting, exemplary apparatus may include a two-beam interferometer, a multiple-beam interferometer, a grating-based interferometer/spectrometer, a Fourier-Transform interferometer, and others. The embodied devices include a highly dispersive medium as defined herein above that appropriately can facilitate either a slow-light effect or a fast-light effect, which is disposed in a propagation path of an electromagnetic (EM) input field, particularly an optical input field; and, a detector disposed in a manner to detect an output field resulting from the input filed interaction with the highly dispersive medium. According to various non-limiting aspects, the output field will present an indicia of a spectral performance metric as described herein. In a non-limiting aspect, the highly dispersive medium may include a plurality of dispersive media. A highly dispersive medium that facilitates a slow-light phenomenon will be characterized by a group index of refraction, $n_g$, being much greater than the phase index of refraction, $n_p$, of the medium near a frequency range of interest (or wherein dn/dω is large and positive) and, particularly, where $n_g \geq 4$; a highly dispersive medium that facilitates a fast-light phenomenon will be characterized by a group index of refraction, $n_g$, being less than the phase index of refraction, $n_p$, of the medium near a frequency range of interest (or wherein dn/dω is large and negative) and, particularly, where $n_g \leq (-)4$. In all of the embodiments herein, $n_g \neq 0$.

An embodiment of the invention is a method for measuring a spectroscopic parameter of an EM input field and, particularly, a method for measuring a spectroscopic parameter with significantly enhanced bandwidth and/or sensitivity and/or resolving power and/or accuracy over currently available measurement techniques. The method involves providing a highly dispersive medium (as that term is defined herein) in a suitable measurement architecture and making appropriate measurements of an EM output field based upon the interaction of an EM input field with the highly dispersive medium. According to various non-limiting aspects, the spectroscopic parameter is a spectral sensitivity metric and a spectral resolving power metric. Other spectroscopic parameters known in the art may also represent quantities of interest and are intended to be embodied herein.

According to the apparatus and method embodiments described herein, non-limiting, exemplary and illustrative highly dispersive media include: a) atomic vapor in the form of alkaline atoms or acetylene, for example, in atomic vapor cells; b) wave-guiding fiber such as, e.g., SMF-28 fiber using stimulated Brillouin scattering, stimulated Raman scattering, or a four-wave mixing effect; erbium- or other suitably doped fiber, multimode fiber, fiber gratings; c) microstructure fiber such as, e.g., hollow-core photonic-band gap fibers having injected atomic vapors, and using nonlinear optical effects in micro-structured fiber; d) solid media such as, e.g., semiconductor compounds (e.g., CdSSe), nonlinear crystals (e.g., KTP, BBO, LiNO3), crystals (e.g., Ruby, Alexandrite); e) integrated lightwave structures such as, e.g., silicon-on-insulator waveguide structures, quantum well structures, silica waveguide structures, semiconductor optical amplifier structures, surface plasmon waveguide structures, ring resonator structures, III-V waveguide structures, II-IV waveguide structures, and exchange-ion waveguide structures; f) liquid media such as, e.g., dyes (e.g., Rhodamine 6G), solutions of certain types of atoms, molecules and quantum dots, liquid crystal mixed with certain types of atoms, molecules and quantum dots; g) meta-materials such as, e.g., photonic band gap materials, defect waveguides/cavities in a photonic band gap structure, negative refractive index materials; and, h) condensate including, e.g., Bose-Einstein condensate using alkali atoms.

BRIEF DESCRIPTION OF THE DRAWINGS

FIG. 3a is a schematic diagram of a slow-light Fabry-Perot interferometer according to a non-limiting exemplary embodiment of the invention; FIG. 3b shows a detailed view of the multiple beam interference in the Fabry-Perot etalon of FIG. 3a;

DETAILED DISCUSSION OF CERTAIN DESCRIPTIVE, ILLUSTRATIVE, AND EXEMPLARY EMBODIMENTS

A non-limiting embodiment of the invention is a spectroscopic interferometer that includes one or more highly dispersive media, which can support a slow-light phenomenon. The design and operation of the device can theoretically provide enhanced spectral sensitivity and spectral resolution by the interferometer by a factor equal to the absolute value of the group index of refraction, $n_g$, of the highly dispersive medium. A discussion of certain practical limitations will accompany the discussion of the exemplary embodiments below.

Non-limiting exemplary and/or illustrative embodiments of spectroscopic interferometer types in which a highly dispersive 'slow-light' medium is used include two-beam interferometers and multiple-beam interferometers as discussed below. Aspects of the invention may also be embodied in a Fourier transform interferometer.

Two-Beam Interferometers

Figure 1:
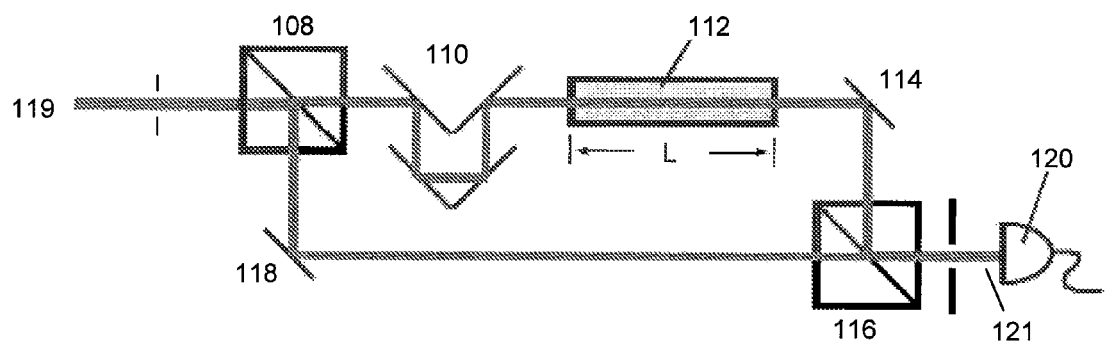
FIG. 1 shows a schematic diagram of a Mach-Zehnder interferometer that contains a highly dispersive slow-light medium in one arm according to a non-limiting, exemplary embodiment of the invention.

A typical example of a two-beam interferometer is the Mach-Zehnder (M-Z) interferometer. FIG. 1 shows a schematic illustration of a Mach-Zehnder spectroscopic interferometer 100-1 according to an embodiment of the invention. The device 100-1 includes a beam-divider 108, an optical path length compensator 110, a highly dispersive 'slow-light medium 112 having a length, L, a turning mirror 114, and a beam-combiner 116, that form one of the two arms of the device, and a turning mirror 118, which with the beam divider 108 and beam combiner 116 form the other of the two arms of the device. A detector 120 is disposed so as to capture the output field 121 from the device. An optical input field is shown at 119.

The two arms are adjusted so that the optical path difference between the arms is equal to the optical path length through the slow-light medium. The transmission, T, of such an interferometer is then given by $$T=\frac{1}{4}(1+e^{-\alpha L}+2e^{-0.5\alpha L}\cos\Delta\omega), \quad (1)$$

where $\alpha$ is the absorption coefficient of the medium and $\Delta\omega$ is the phase difference between the two arms expressed by $$\Delta\omega(v)=(2\pi v/c)n(v)L, \quad (2)$$

where $v$ is the frequency of the input field, c is the speed of light in vacuum, and $n(v)$ is the refractive index of the slow-light medium.

The spectral sensitivity of such an interferometer can be described by the rate at which the phase difference term $\Delta\phi$ changes with frequency u. Thus $$d\Delta\phi/dv=d/dv(2\pi vn(v)L/c)=(2\pi L/c)(n+vdn/dv)=2\pi Ln_g/c, \quad (3)$$

where $n_g \equiv n+vdn/dv$ is the group index of refraction.

If the spectral resolution, $\delta v_{min}$, is defined to be to be the frequency difference between adjacent transmission peaks and valleys, the expression for the spectral resolution can be written as $$\delta v_{min}=c/2 \, Ln_g. \quad (4)$$

The fringe visibility, V, of such a M-Z interferometer is given by $$V=I_{out,max}-I_{out,min}/I_{out,max}+I_{out,min}=2e^{-0.5\alpha L}/1+e^{-\alpha L} \quad (5)$$

For a lossless M-Z interferometer, the value of the visibility V is 1. The associated loss or gain of the slow-light medium will decrease the fringe visibility V. According to a practical aspect of the invention, the condition is set that the loss through the slow-light medium be less than 1/e (or gain less than a factor of e). Consequently, the following restriction on the length L of the medium becomes $$|\alpha L| \leq 1. \quad (6)$$

This condition indicates that the visibility V is always no less than 0.65. Substituting this condition into Eq. (4), one obtains the following expression for the minimum spectral resolution for a M-Z interferometer with a lossy slow-light medium:

$$\delta v_{min}=|c\alpha/2n_g|. \quad (7)$$

This expression for the spectral resolution is also applicable to other types of two-beam interferometers, such as, e.g., a Michelson interferometer, a Twyman-Green interferometer, and others known in the art.

Figure 2:
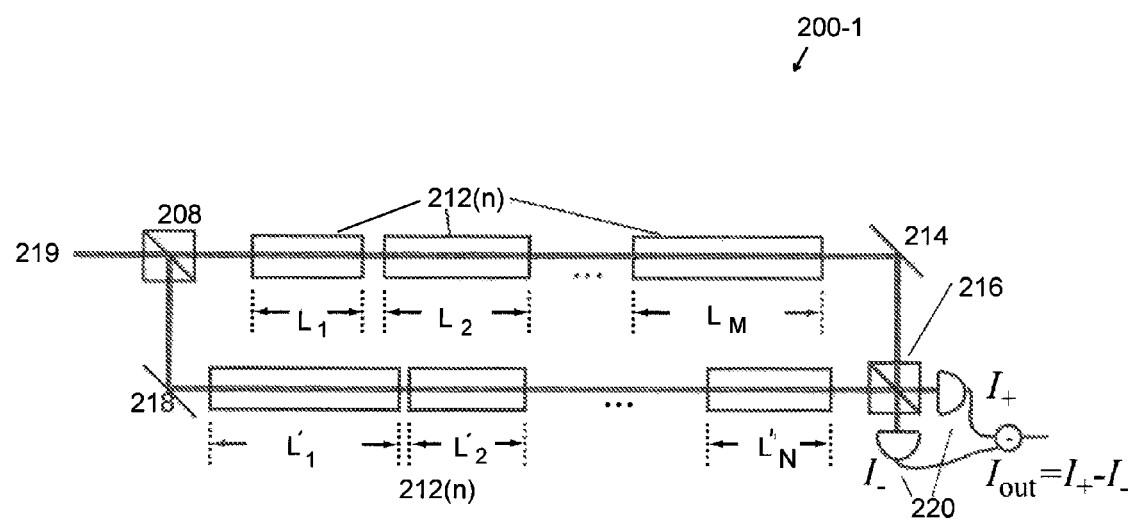
FIG. 2 shows a schematic diagram of a Mach-Zehnder interferometer that contains multiple dispersive and/or non-dispersive media in both arms according to a non-limiting, exemplary embodiment of the invention.

An alternative aspect of a M-Z interferometer according to an embodiment of the invention is illustrated in FIG. 2 as device 200-1. The device is similar to the M-Z interferometer 100-1 in FIG. 1, except multiple highly dispersive, with or without non-dispersive, media $212_n$ and $212'_n$ are disposed in the two arms of the interferometer. In this aspect, two detectors 220 that measure the output field intensities, $I_+$, $I_-$ are provided.

Multiple-Beam Interferometers

Figure 3:
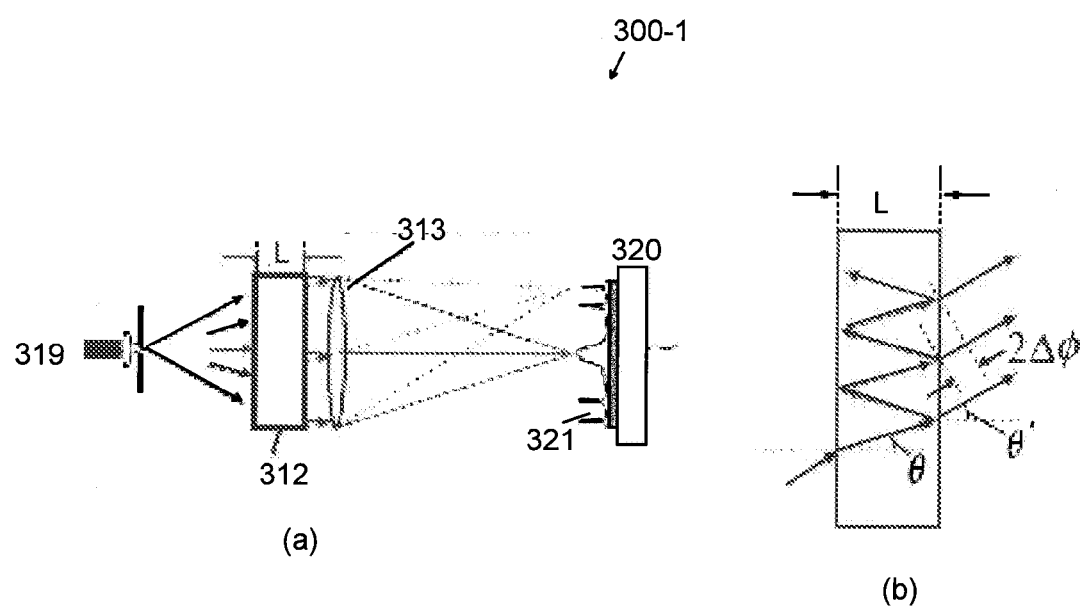

An embodiment of the invention is a spectroscopic interferometer in the form of a Fabry-Perot (F-P) interferometer 300-1 as illustrated in FIG. 3a. The apparatus comprises a highly dispersive slow-light F-P etalon 312 having an axial thickness, L, followed by a Fourier lens 313 and a detector array 320 in a detector plane to detect output fringes 321. The optical input field is represented by 319. FIG. 3b provides a more detailed look at the multiple beam interference within the F-P etalon 312.

For the highly dispersive slow light F-P etalon 312 of thickness, L, the transmission, T, of the interferometer as a function of the incidence angle $\theta$ is given by $$T(\theta) \approx T_s^2 T_L(\theta)/[(1-R_S T_L(\theta))^2 (1+F^2 \sin^2 \Delta\phi(\theta)], \quad (8)$$

where $T_s$ and $R_s$ are the transmissivity and reflectivity at the air-medium interface, respectively, $T_L(\theta) \equiv \exp(-\alpha L/\cos \theta)$ is the transmissivity of a plane wave at incident angle $\theta$ inside the medium, $\Delta\phi = kL \cos \theta + \phi_0$ is the phase difference term, $\alpha$ and k are the absorption coefficient and the wave number of the field inside the slow-light medium, respectively, $\phi_0$ is the phase change of field due to reflection at the medium-air interface and F is the finesse defined as $F \equiv 2R^{0.5}_S T_L(\theta)/[1-R_S T_L(\theta)]$.

The angle, $\theta_m$, between the center of the $m^{th}$ fringe and the normal direction is given by $$\theta_m = \cos^{-1}(1-(M-m)\lambda/2 \text{ Ln}), \quad (9)$$

where $M \approx 2$ Ln/$\lambda$ is the order of the fringe at normal incidence.

The spectral sensitivity of the $m^{th}$ order fringe is therefore given by $$d\theta_m/d\lambda = (M-m/2L \sin \theta_m)[(1/n)-(\lambda dn/n^2 d\lambda)] = (M-m) n_g/2n^2 L \sin \theta_m. \quad (10)$$

For the case in which the finesse is high (i.e., small angular spread of the fringes), the angular spread [full width at half maximum (FWHM)] of the $m^{th}$ order fringe is determined through the relation $\delta\Delta\phi_m = 2/F$ and is given by $$\delta\lambda_m = \lambda/\pi \text{ Lnsin } \theta_m F. \quad (11)$$

Thus the spectral resolution, $\delta\lambda_m$, of the $m^{th}$ order fringe is given by $$\delta\lambda_m = (d\lambda/d\theta)\delta\theta_m = 2n\lambda/(M-m)n_g \pi F. \quad (12)$$

For a F-P interferometer, one typically has the relation M>>m. Thus, the expression for the spectral resolution of a F-P interferometer can be written as $$\delta\lambda_{min} \approx 2n\lambda/Mn_g \pi F = \lambda^2/n_g L \pi F \quad (13)$$

for small absorption by the highly dispersive medium.

Using the definition of the finesse, F, in Equ. (13) indicates how the absorption or gain of the slow-light medium influences the spectral resolution. When the fractional loss or gain of the field after a single pass through the slow-light medium is small, Equ. (13) can be approximated by $$\delta\lambda_{min} \approx \lambda^2(1+\alpha L-R_S)/n_g L \pi = |[\lambda^2(1-R_S)/2n_g L \pi] + [\lambda^2 \alpha/n_g 2\pi]|, \quad (14)$$

or, in frequency units $$\delta\nu_{min} |c(1-R_S)/2n_g L\pi] + [c\alpha/2n_g \pi]. \quad (15)$$

Per Equ. (15), the resolution is given by the sum of two terms. The first term is present even for a lossless interferometer, and is inversely proportional to the group index $n_g$. The second term is proportional to the ratio between $\alpha$ and $n_g$. In principle, the first term can be made to vanish when the reflectivity at the surface $R_S$ approaches unity. In such cases, the overall spectral resolution will be primarily determined by the second term such that $$\delta\nu_{min} \approx |c\alpha/n_g 2\pi|. \quad (16)$$

If the slow-light medium has gain such that the single-pass gain gL is comparable to the loss at the reflection $1-R_s$, the two terms in Eq. (15) would become comparable to each other but with opposite signs. In this case, very high spectral resolution may be obtained as long as the gain is not saturated.

The expression of Equ. (15) is also valid for other types of multiple-beam interferometers, such as but not limited to, a wedged shear interferometer 400-1 as illustrated in FIG. 4, according to another non-limiting aspect of the invention.

Figure 4:
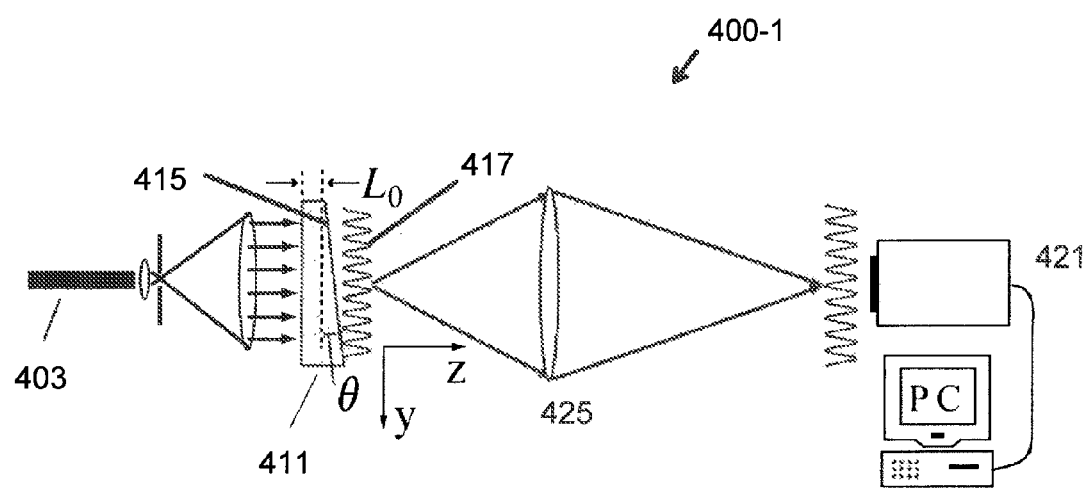
FIG. 4 shows a schematic diagram of a wedged shear interferometer containing a slow-light medium according to a non-limiting exemplary embodiment of the invention.

FIG. 4 shows an exemplary wedged shear interferometer. An input field 403 is incident on a highly dispersive slow-light wedge plate 411. Due to the interference among the light waves bouncing back and forth between the front and back surfaces of the wedge plate, tilt fringes 417 occur at the exit surface 415 of the plate. The fringe patterns are imaged onto a detector 421 via an imaging system 425. When the wedge angle $\theta$ is small (i.e., the change of the thickness of the wedge plate across the incident area of the beam is much less than its average thickness $L_0$, the intensity transmission as a function of lateral fringe position y can be written as $$T(y) = \frac{T^2 T_L}{(1-RT)^2} \frac{1}{1+F \sin^2 \Delta\phi(y)}, \quad (17)$$

where T and R are the transmittivity and reflectivity at the air-medium interface, respectively; $T_L = \exp(-\alpha L_0)$ is the transmittivity through the medium; $\Delta\phi = k(L_0 + \theta y) + \psi_0$ is the phase difference term; $\alpha$ and k are the absorption coefficient and the wave number of the field inside the wedge plate, respectively; $\psi_0$ is the phase change of field due to reflection at the air-medium interface; and F is the finesse defined as $F \equiv 4RT_L^2/(1-RT_L)^2$. The position of the $m^{th}$ order fringe peak is given by $$y_m = \frac{(m\pi - \psi_0)c}{n\theta\omega} - \frac{L_0}{\theta} \quad (18)$$

If the frequency of the incident field changes slightly, the fringe peak $y_m$ will shift laterally. The rate of movement of the fringes as a function of frequency is given by $$\frac{dy_m}{d\omega} = -\frac{(m\pi-\psi_0)c}{n^2\theta\omega^2}\left(n+\omega\frac{dn}{d\omega}\right) \approx -\frac{\bar{m}\pi c n_g}{n^2\theta\omega^2} \quad (19)$$

where $\bar{m} \approx m\omega L_0/(c\pi)$ is the approximated order number of the fringe peak (again, the small wedge angle condition of $L_0 >> \theta y_{max}$ is assumed), and $$n_g = n + \omega\frac{dn}{d\omega}$$

is the group index of the medium. One can also normalize this movement rate with the fringe period $\Lambda = c\pi/n\omega\theta$ and obtain the following normalized expression for the rate of fringe movement:

$$\frac{1}{\Lambda}\frac{dy_m}{d\omega} \approx -\frac{\overline{m}n_g}{n\omega} = -\frac{L_0 n_g}{c\pi} \text{ or} \quad (20)$$

$$\frac{1}{\Lambda}\frac{dy_m}{d\lambda} \approx -\frac{\overline{m}n_g}{n\lambda} = -\frac{2L_0 n_g}{\lambda^2} \quad (21)$$

One sees from Equs. (20) and (21) that the movement rate is proportional to the group index $n_g$ of the wedge plate. The wedge interferometer is designed to monitor the frequency shift of the incident light by detecting the lateral movement of the fringes, and therefore its spectral sensitivity is directly proportional to the rate of the fringe movement; i.e., proportional to $n_g$. It is also noted that other wavelength-dependent variables in Eq. (17) such as R, T, and F, usually vary slowly within the wavelength range of interest, and therefore their impact on the spectral sensitivity can be ignored. Thus, the spectral sensitivity of such an interferometer device 400-1 can be enhanced significantly when one or more appropriate highly dispersive media, which has a large group index $n_g$ near the frequency range of interest, is introduced in the interferometer.

Such an interferometer can also be used to measure the spectrum of the incident field. Its resolving power (defined as the ratio between the center wavelength and the minimum resolvable wavelength resolution) is given by $$R = \frac{\lambda}{\Delta\lambda_{min}} = \frac{\pi L_0 n_g \sqrt{F}}{\lambda} \quad (22)$$

As shown, the resolving power is also proportional to the group index $n_g$ of the medium, and therefore can be enhanced significantly when one or more appropriate dispersive media (which has a large group index $n_g$ near the frequency range of interest) is introduced in the interferometer.

It will be appreciated that the wedge surface having a constant inclination angle, $\theta(y)$, in the illustrative wedged shear interferometer aspect is a specific case of the more general condition of a curved surface (for fringe creation) in which $d\theta/dy$ is not constant. However, over each small region $dy$, $\theta$ can be considered to be constant.

An experiment was carried out using a wedged shear interferometer as described in Shi et al. *Enhancing the spectral sensitivity of interferometers using slow-light media*, OPTICS LETTERS, Vol. 32, No. 8 (Apr. 15, 2007), the subject matter of which is incorporated herein by reference in its entirety. The highly dispersive slow-light medium used as the wedge plate in the interferometer was a $CdS_{0.625}Se_{0.375}$ c-cut single crystal. The plate was about 0.5 mm thick, and the angle $\theta$ between the two surfaces was about 2.28 degrees. The absorption edge of this direct-band gap semiconductor sample was measured to be 2.15 eV (i.e., 578 nm). According to the Kramers-Kronig relation, the refractive index of this sample experienced a rapid change near the absorption edge and consequently exhibited a large group index in that region. The refractive index (for ordinary polarized light) as a function of wavelength can be determined through the relation $$n_o(\omega) = \sqrt{1 - 2c_o^0/[y_B - q\tan^{-1}(y_B/q)]},$$

where $c_o^0$ and $y_B$ are coefficients whose numerical values are 0.996 and 3.324 for $CdS_{0.625}Se_{0.375}$, respectively; $q = \sqrt{1 - \hbar\omega/G}$; and $G = 2.15$ eV is the band gap energy. Numerically, the values of the refractive index n and group index $n_g$ at $\lambda = 605$ nm are 2.64 and 3.87, respectively. As the wavelength was tuned towards the absorption edge, the group index increased much faster than the phase index. At $\lambda = 587.5$ nm, n has a value of 2.69, almost the same as that at $\lambda = 605$ nm, but the group index now is almost twice as large as n with a value of 4.80. Because the changes in n and $n_g$ as the wavelength decreases from 605 nm to 587.5 nm are very different, it was possible to distinguish experimentally whether the spectral sensitivity of the interferometer was dependent upon n or $n_g$.

A Rhodamine 6G dye laser was used as the tunable source in the experiment. The fringe patterns on the exit surface of the wedge plate were imaged onto a CCD beam profiler using an imaging lens and were recorded digitally. Note that the imaging lens would not be required if the CCD was attached directly to the exit surface of the wedge plate. To determine the spectral sensitivity near each wavelength, the fringe patterns were recorded while the laser was detuned near this wavelength with a detuning step size of 0.01 nm for 21 steps. The relative peak positions were determined at each detuning step, and the fringe movement rate near this wavelength was calculated using linear fitting of the peak positions. The wavelengths at which the spectral sensitivity was measured were chosen from 605 nm to 587.5 nm with a decrement of 2.5 nm each time.

Figure 5:
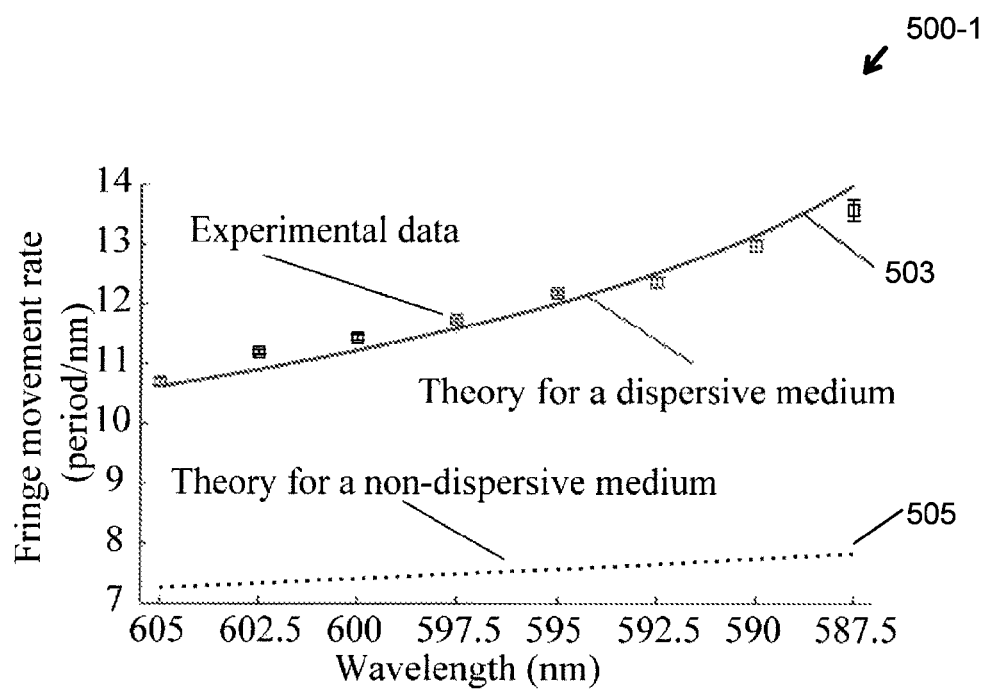
FIG. 5 shows a graph that illustrates the relative rate of fringe movement as a function of wavelength according to an illustrative aspect of the invention.

FIG. 5 shows a graph 500-1 that illustrates the relative rate of fringe movement (normalized by the fringe period) at different wavelengths. The spectral sensitivity of the interferometer increases from 10.7 to 13.5 periods/nm (see the squares in FIG. 5) as the wavelength changes from 605 nm to 587.5 nm. This increase agrees very well with the change of group index of $CdS_{0.625}Se_{0.375}$ as the wavelength is tuned towards the absorption edge. The solid line 503 in FIG. 5 shows the theoretical predictions given by Eq. (21), which match very well with the experimental results. Also note that the rate of fringe movement (i.e., the spectral sensitivity) of the interferometer with a highly dispersive medium is about twice as large as that of an interferometer with a non-dispersive medium with the same refractive index (i.e., replacing $n_g$ by the phase index n in Eq. (21); see the dotted line 505 in FIG. 5). Furthermore, the sensitivity for the non-dispersive medium in the interferometer changes only slightly as the wavelength changes from 605 nm to 587.5 nm.

The fringe patterns on the exit surface of the wedge plate could also be collected directly by placing an image capturing device against the exit surface thus eliminating the imaging system 425 in FIG. 4.

Fourier Transform Interferometer

Shi et al., as reported in Phys. Rev. Lett. 99, 240801 (2007), the subject matter of which is incorporated herein by reference in its entirety, experimentally demonstrated a Fourier transform (FT) interferometer using the method of variable slow-light. Such a FT interferometer typically contains two fixed arms, with a variable slow-light medium in one arm. The two arms are adjusted to have zero optical path length difference when the relative group index $n'_g = n_g - n$ of the variable slow-light medium is zero. In the ideal case in which the slow-light medium is lossless and has uniform group index over the bandwidth of interest, the output $I_{out}$ of such a slow-light FT-interferometer is given by $$I_{out}(\tau_g) = Re\{\int I_n(v_0 + v')\exp(i2\pi v' \tau_g) dv'\}$$

where $v_0$ is a reference frequency at which $n(v_0)$ is independent of the relative group index $n'_g$ and $\tau_g = n'g \, L/c$ is the group delay between the two arms of the interferometer, which can be varied from zero to a maximum value $\tau_{g,max}$.

Similar to a conventional FT interferometer, the spectral resolution of such an ideal slow-light FT interferometer is limited by the maximum group delay between the two arms through the relation $$\delta v_1 = 1/2\tau_{g,max} = c/n'_{g,max} L.$$

In practice, however, a variable slow-light medium typically has associated frequency-dependent loss, which is usually linearly proportional to the relative group index $n'_g$. Based upon an analysis as set forth in Shi et al., id., the effective linewidth, $\gamma_{eff}$, can be written as $$\gamma_{eff} = c\alpha/4\pi n'_g$$

and the overall spectral resolution of the slow-light FT interferometer can be expressed as $$\delta v_{min} = \max[(c/2n'_{g,max}L),(c\alpha/2\pi n'_g)].$$

Since L can be arbitrarily large, the spectral resolution will be primarily limited by the second contribution, $c\alpha/2\pi n'_g$.

Figure 6:
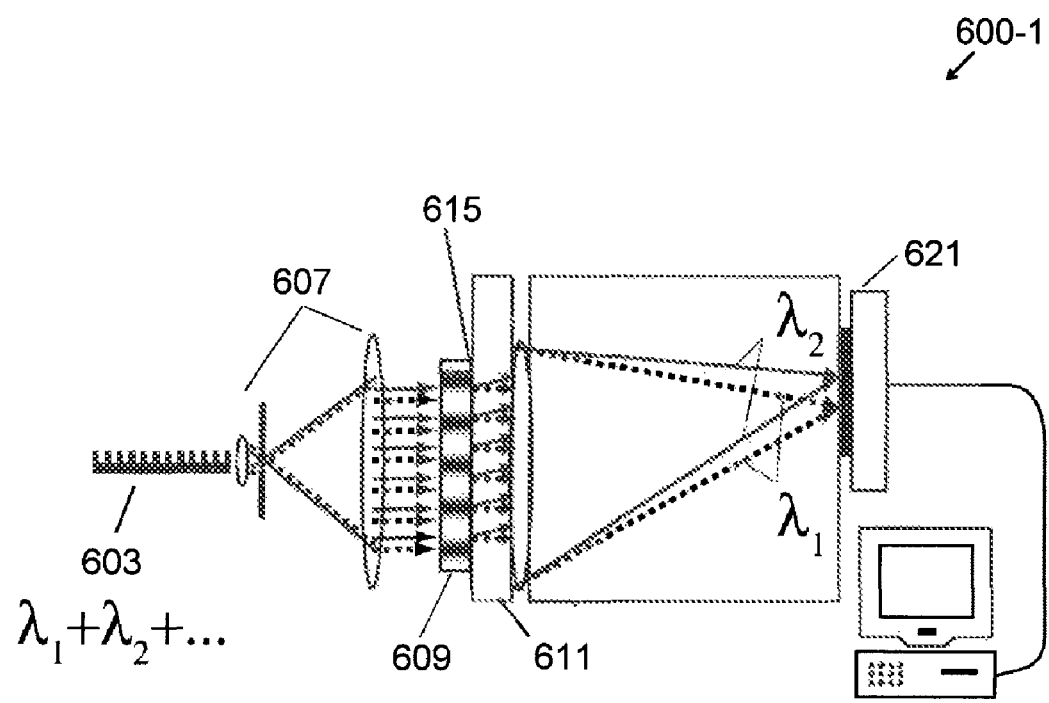
FIG. 6 shows a schematic diagram of a planar grating based spectrometer according to a non-limiting, exemplary embodiment of the invention.

Another non-limiting, exemplary embodiment is a grating-based spectrometer/wavelength monitor 600-1 as illustrated in FIG. 6. The illustrative apparatus comprises steering optics 607 that deliver an input EM field 603 onto a transmissive diffraction grating 609. A highly dispersive medium 611 is placed between the exit surface 615 of the grating and an imaging system 621. Another dispersive medium (not shown) could be placed between the imaging unit and the detecting component 621 if deemed necessary to ensure that the angular dispersion does not disappear after a slow-light medium/non-dispersive medium interface. Depending upon the design, the device may not require steering optics (607) and/or an imaging system (621).

Non-limiting examples of suitable grating types include arrayed-waveguide gratings, eched diffraction gratings, ruled gratings, holographic gratings, and other known formats. According to the instant embodiment, the device uses one or more diffraction gratings to separate different spectral components of an input field. An input field 603 incident on the grating 609 will be diffracted by the grating into various diffraction orders. The incident and $m^{th}$ order diffracted fields satisfy the following grating function:

$$n_{in}\sin\theta_{in} + n_{diff}\sin\theta_{m,diff} = \frac{m\lambda}{\Lambda}, \quad (23)$$

where $n_{in}$ and $n_{diff}$ are the refractive index in the incident and diffracted region, respectively, $\theta_{in}$ and $\theta_{m,diff}$ are the incident and diffracted angle, respectively, $\lambda$ is the wavelength in vacuum, and $\Lambda$ is the local grating period.

The spectral sensitivity can be expressed by $$\frac{d\theta_{m,diff}}{d\lambda} = \frac{1}{\cos\theta_{m,diff}}\left[\frac{m}{\Lambda n_{diff}^2}\left(n_{diff} - \lambda\frac{dn_{diff}}{d\lambda}\right) - \frac{\frac{dn_{in}}{d\lambda}}{n_{diff}} + \frac{n_{in}}{n_{diff}^2}\frac{dn_{diff}}{d\lambda}\right]$$

$$= \frac{1}{\cos\theta_{m,diff}}\left[\frac{mn_{g,diff}}{\Lambda n_{diff}^2} - \frac{\frac{dn_{in}}{d\lambda}}{n_{diff}} + \frac{n_{in}}{n_{diff}^2}\frac{dn_{diff}}{d\lambda}\right],$$

where $n_{g,diff}$ is the group index of the diffraction region. If $n_{in} = n_{diff}$, the above expression can be simplified as follows, $$\frac{d\theta_{m,diff}}{d\lambda} = \frac{mn_{g,diff}}{\cos\theta_{m,diff}\Lambda n_{diff}^2}.$$

One sees that the spectral sensitivity is indeed proportional to the group index of the medium that fills around the grating. When such a planar grating with N pitch periods is used as a spectrometer, its resolving power can be written as $$R \equiv \frac{\lambda}{\Delta\lambda_{min}} = \frac{mNn_{g,diff}}{n_{diff}}. \quad (24)$$

where $\Delta\lambda_{min}$ is the minimum resolvable wavelength difference. One sees that the resolving power R is enhanced by a factor equal to the group index of the medium as well.

Figure 7:
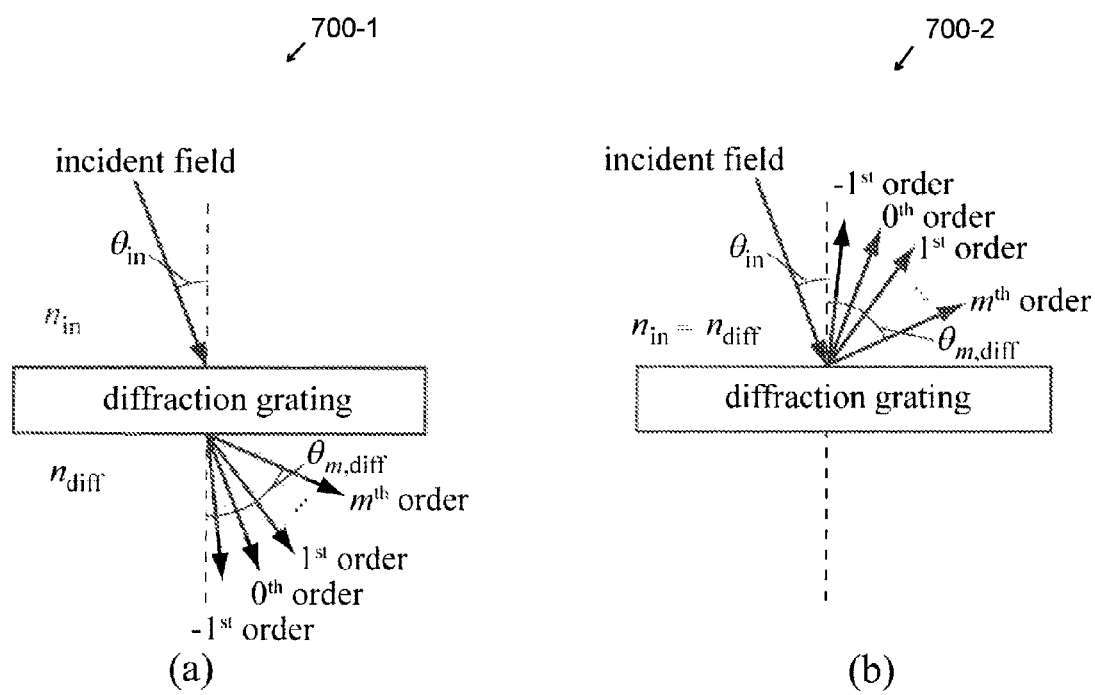
FIGS. 7a, 7b, respectively, show a schematic diagram of a transmissive diffraction grating and a reflective diffraction grating according to non-limiting, illustrative aspects of the invention.

The practical geometry of the grating can be of the transmissive type 700-1 as illustrated in FIG. 7a or the reflective type 700-2 as illustrated in FIG. 7b. In the transmissive type grating, the incident field and diffracted field propagate in different regions, while in the reflective type grating the two fields propagate in the same region.

The grating can be of substantially any type, such as specific geometry of one or more media, alternating different media, gradually alternating refractive index, or a series of waveguides/optical paths that have specific optical path differences between adjacent units (pitch). The grating can be planar, which means that all the pitches are in a line. Alternatively, the grating can be curved, which may benefit imaging considerations. One or more optical elements (e.g., lenses) can be used to reshape the incident field before it is incident on the grating. One or more optical elements (e.g., lenses) can be used to reshape the diffracted field before it is detected by the detection unit (such as to form a focused spot at the detection unit). The grating can also be non-periodic to get particular types of spectral responses.

According to an embodiment of the invention, the (one or more) highly dispersive medium may be a fast-light medium such that the dispersive medium has a very small absolute value of the group index, especially when $n_g$ is smaller then the phase refractive index n. Such cases exist when the derivative of the refractive index with respect to frequency, $$\frac{dn}{d\omega},$$

is negative.

In such cases, the interferometer will be less sensitive to the frequency shift of the incident field. This can be seen from Equ. (20) and Equ. (21) above. When a wedged shear interferometer 400-1 as illustrated in FIG. 4, for example, is used as a spectrometer, the free spectral range of such a device can be expressed by, $$FSR \approx \frac{\lambda^2}{2L_0 n_g}$$

One sees that the free spectral range is increased by a factor of $1/n_g$ for this fast light case. Thus such an interferometer may be used to facilitate a spectrometer that has a significantly large measurable spectral range.

According to various, non-limiting aspects of the apparatus and method embodiments disclosed herein, examples of highly dispersive media that support slow-light and/or fast-light phenomena, and their control, include but are not limited to the following:

1) Atomic vapor; the dispersion can be realized by controlling the number density, the complex amplitude of one or more optical control fields, the complex amplitude of one or more electrical fields, the complex amplitude of one or more magnetic fields, the number density of one or more other gas/particles, the temperature, or other techniques that can modify the interaction between the atom and the probe field. Examples of atomic vapor cells include alkaline atoms (cesium, rubidium, sodium, etc.), acetylene (for telecommunication wavelength), and others known in the art.

2) Fiber; the dispersion can be realized by changing the density and the composition of the medium/dopant filled around or inside the fiber, controlling the complex amplitude of one or more optical control fields, the complex amplitude of one or more electrical fields, the complex amplitude of one or more magnetic fields, the temperature, the pressure on the fiber, fiber gratings structures, or other techniques that can modify the interaction between the fiber and the probe field. Examples include SMF-28 fiber using stimulated Brillouin scattering, stimulated Raman scattering, a four-wave mixing effect; erbium doped fiber, other doped fiber, multimode fiber, and other known fiber media.

3) Microstructure fiber; the dispersion can be realized by controlling the density and composition of the medium (gas/liquid/gel/particles, etc.) filled within and/or around the microstructure fiber, the complex amplitude of one or more optical control fields, the complex amplitude of one or more electrical fields, the complex amplitude of one or more magnetic fields, the temperature, the pressure on the fiber, or other techniques that can modify the interaction between the microstructure fiber and the probe field. Examples include injecting atomic vapors in hollow-core photonic-band gap fibers, using nonlinear optical effects in micro-structured fiber, and other known microstructure fiber media.

4) Solid medium; the dispersion can be realized by controlling the complex amplitude of one or more optical control fields, the complex amplitude of one or more electrical fields, the complex amplitude of one or more magnetic fields, the number density of one or more other gas/particles/liquid that around the medium, the temperature, the forced pressure, or other techniques that can modify the interaction between the bulk medium and the probe field. Examples include semiconductor compounds (e.g., CdSSe), nonlinear crystals (e.g., KTP, BBO, LiNO3), crystals (e.g., Ruby, Alexandrite), and other known solid media.

5) Integrated lightwave structures; the dispersion can be realized by controlling the complex amplitude of one or more optical control fields, embedding certain types of atoms, molecules, particles on/into the structures, the complex amplitude of one or more electrical fields, the complex amplitude of one or more magnetic fields, the number density of one or more other media (e.g., gas, particles, liquid, gel, etc.), the temperature, or other techniques that can modify the interaction between the integrated lightwave structures and the probe field. Examples include silicon-on-insulator waveguide structures, quantum well structures, silica waveguide structures, semiconductor optical amplifier structure, surface plasmon waveguide structures, ring resonator structures, III-V waveguide structures, II-IV waveguide structures, exchange-ion waveguide structures, and other known integrated lightwave media.

6) Liquid medium; the dispersion can be realized by controlling the concentration of particular particles; the complex amplitude of one or more optical control fields, the complex amplitude of one or more electrical fields, the complex amplitude of one or more magnetic fields, the number density of one or more other particles/liquid, the temperature, or other techniques that can modify the interaction between the liquid and the probe field. Examples include dyes (e.g., Rhodamine 6G), solutions of certain types of atoms, molecules and quantum dots, liquid crystals mixed with certain types of atoms, molecules and quantum dots, and other known liquid media.

7) Meta-materials; the dispersion can be realized by controlling the size and composition of artificial structures; the complex amplitude of one or more optical control fields, the complex amplitude of one or more electrical fields, the complex amplitude of one or more magnetic fields, the number density of one or more other gas/particles/liquid/gel/etc. that surrounds the meta-material, the temperature, or other techniques that can modify the interaction between the meta-material and the probe field. Examples include photonic band gap materials, defect waveguides/cavities in a photonic band gap structure, negative refractive index materials, and other known meta-materials media.

8) Condensate; the dispersion can be realized by controlling the size and density of the condensate; the complex amplitude of one or more optical control fields, the complex amplitude of one or more electrical fields, the complex amplitude of one or more magnetic fields, the temperature, the pressure, the density of other gas/condensate/etc., or other techniques that can modify the interaction between the condensate and the probe field. Examples include Bose-Einstein condensate using alkali atoms, and other known condensates.

Interferometer Performance for Exemplary Slow Light Techniques

The performance of slow-light interferometers using three specific slow-light mechanisms will now be discussed.

As described above, the spectral resolution of two-beam, multiple beam, and Fourier transform interferometers are limited by, $|c\alpha/(2n_g)|$, $|c\alpha/(\pi n_g)|$, and $|c\alpha/(2\pi n'_g)|$, respectively. For the following discussion, we will define the characteristic spectral resolution as $\delta v_c \equiv |c\alpha/(2\pi n'_g)|$; and we assume that the group index $n_g$ is much larger than the refractive index n such that $n'_g \approx n_g$.

The working bandwidth $\Delta v_w$ of a slow-light medium is calculated such that the characteristic spectral resolution within the working bandwidth does not vary by more than a factor of 2. The working finesse, $F_w = \Delta v_w / \delta v_c$, is calculated accordingly.

A. Single Isolated Gain Line

Single-resonance gain features are commonly used to achieve slow light because of the rapid change of the refractive index in the vicinity of the resonance center. For example, the gain coefficient, refractive index, and reduced group index of an unsaturated Lorentzian gain line as functions of the frequency detuning $v'=v-v_0$ from the resonance center $v_0$ are given by $$g(v') = g_0 \frac{\gamma^2}{v'^2 + \gamma^2}, \tag{25}$$

$$n(v') = n(0) + \frac{g_0}{2k_0} \frac{\gamma v'}{v'^2 + \gamma^2}, \text{ and} \tag{26}$$

$$n'_g(\nu') = \frac{cg_0\gamma}{4\pi} \frac{-\nu'^2 + \gamma^2}{(\nu'^2 + \gamma^2)^2}, \quad (27)$$

where $g_0$ and $k_0$ are the gain coefficient and the wave number at the center frequency $\nu_0$, respectively, $\gamma$ is the half width at half maximum (HWHM) linewidth, and n(0) is the background refractive index at the resonance center.

From the above expressions, one can obtain (as Equ. [28]) the ratio between g and $n'_g$ as $$\frac{g(\nu')}{n'_g(\nu')} = -\frac{4\pi\gamma}{c} \frac{\nu'^2 + \gamma^2}{\nu'^2 - \gamma^2}.$$

The characteristic spectral resolution at the resonance center is then given (as Equ. [29]) by $$\delta\nu_c(\nu'=0) = \left|\frac{c\alpha(0)}{2\pi n'_g(0)}\right| = 2\gamma.$$

From Equ. [28], the spectral resolution is frequency dependent and deteriorates as the frequency moves away from the resonance center. The working bandwidth is determined through the relation $$\delta\nu_c(\nu'=0.5\Delta\nu_w) = 2\delta\nu_c(\nu'=0), \quad [30]$$

and is given by $$\Delta\nu_w = 2\gamma(3^{-1/2}). \quad [31]$$

Consequently, the working finesse $F_w$ is given by $$F_w = (3^{-1/2}).$$

Figure 8:
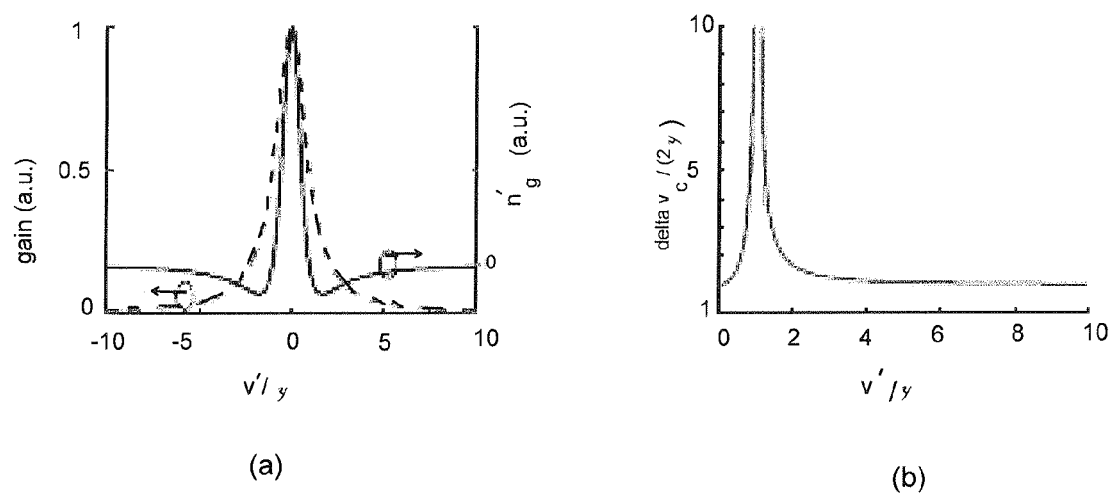
FIG. 8a graphically illustrates the relative group index and gain coefficient, and FIG. 8b, the characteristic spectral resolution, as functions of the normalized frequency detuning from the resonance center for a single Lorentzian gain line medium, according to an illustrative aspect of the invention.

The working finesse is independent of the linewidth of the resonance, and is less than unity, which is due to the rapid change in spectral resolution (see FIG. 8b) caused by the rapid variation of the group index and the gain coefficient in the vicinity of a Lorentzian resonance center (see FIG. 8a). This result indicates that such a slow-light medium may be useful for detecting the frequency shift of an input field, but is not practically suitable for constructing a spectrometer to measure a broad spectrum because of its very limited working finesse near the resonance center.

Two techniques make it possible to overcome this limitation. One is to use a broadened gain feature with a flattened top (e.g., using multiple gain lines instead of a single Lorentzian gain line to increase the working bandwidth). The other is to put the gain feature on a broadband absorption background to make the medium transparent near the resonance center. Using the latter technique, one can make the absolute magnitude of the gain coefficient be very small near the resonance center and consequently achieve high spectral resolution because the characteristic spectral resolution will no longer be restricted by Equ. [29].

It is further noted, however, that the ratio given by Equ. [28] does not change significantly in the wings of the resonance when the frequency detuning $\nu'$ is much larger than $\gamma$ (also see FIG. 8b). This result indicates that such a slow-light medium can be used in a spectrometer as long as the working frequency range is chosen to be in the wing of the resonance center, and so long as the strength of the resonance is great enough to provide a large group index in the wing region.

B. Separated Double Absorption Lines

It has recently been reported that the use of the transparency window between two separated absorption features is a very effective technique to realize slow-light. Here we consider the case in which two identical Lorentzian resonance lines of HWHM linewidth $\gamma$ and separated by $2\Delta$ are used. The absorption coefficient, relative refractive index $n'(\nu') \equiv n(\nu') - n(\nu'=0)$, and relative group index as functions of the detuning $\nu' = \nu - \nu_0$ from the center frequency $\nu_0$ half way between the two resonance lines are given by $$\alpha(\nu') = \alpha_0\left[\frac{\gamma^2}{(\nu'-\Delta)^2 + \gamma^2} + \frac{\gamma^2}{(\nu'+\Delta)^2 + \gamma^2}\right], \quad (32)$$

$$n'(\nu') = -\frac{\alpha_0}{2k_0}\left\{\frac{\gamma(\nu'-\Delta)}{(\nu'-\Delta)^2 + \gamma^2} + \frac{\gamma(\nu'+\Delta)}{(\nu'+\Delta)^2 + \gamma^2}\right\} \text{ and} \quad (33)$$

$$n'_g = \frac{c\alpha_0\gamma}{4\pi}\left[\frac{(\nu'-\Delta)^2 - \gamma^2}{[(\nu'-\Delta)^2 + \gamma^2]^2} + \frac{(\nu'+\Delta)^2 - \gamma^2}{[(\nu'+\Delta)^2 + \gamma^2]^2}\right] \quad (34)$$

Thus the ratio between $n'_g$ and $\alpha$ is given by $$\frac{n'_g(\nu')}{\alpha(\nu')} = \frac{c}{4\pi}\left[\frac{1}{\gamma} + \frac{2\gamma}{\nu'^2 + \gamma^2 + \Delta^2} - \frac{2\gamma}{(\nu'-\Delta)^2 + \gamma^2} - \frac{2\gamma}{(\nu'+\Delta)^2 + \gamma^2}\right]. \quad (35)$$

The characteristic spectral resolution at the center frequency $\nu_0$ is thus given by $$\delta\nu_c(\nu'=0) = \left|\frac{c\alpha(0)}{2\pi n'_g(0)}\right| = 2\gamma\frac{\Delta^2 + \gamma^2}{\Delta^2 - \gamma^2}. \quad (36)$$

Figure 9:
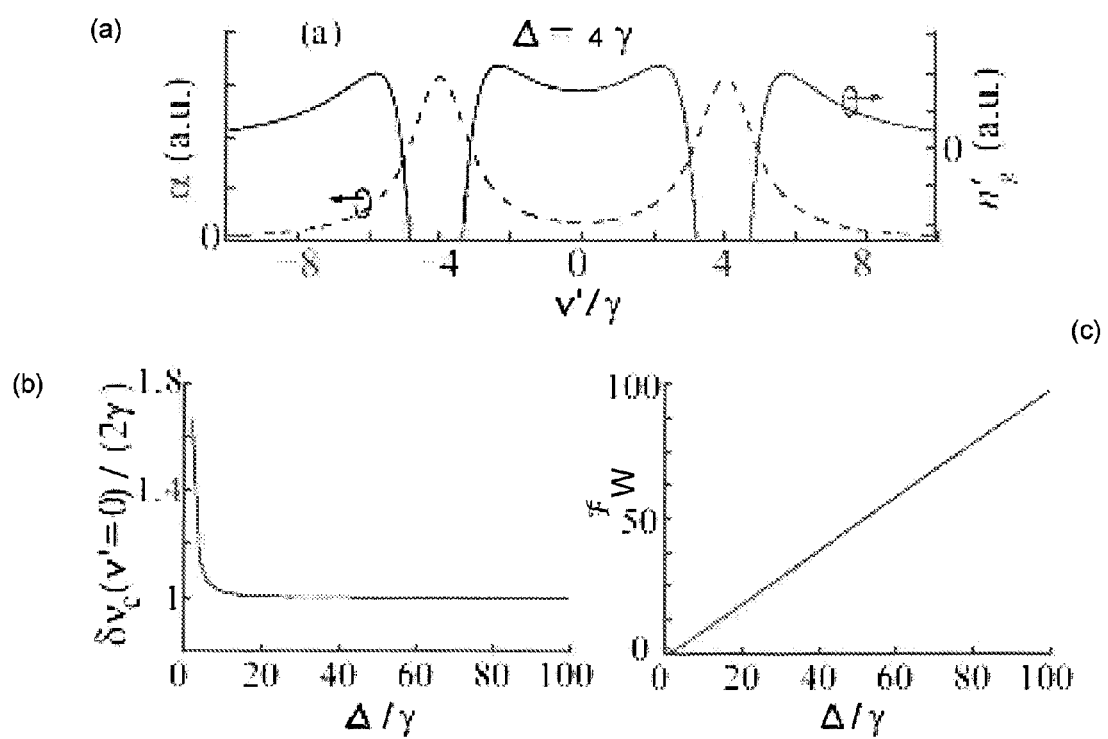
FIG. 9a graphically illustrates the relative group index and absorption coefficient as functions of detuning for a double-absorption-line medium with $\Delta=4\gamma$.
FIG. 9b graphically illustrates the characteristic spectral resolution.
FIG. 9c graphically illustrates the working finesse, as functions of the normalized half separation between the two resonance centers, according to an illustrative aspect of the invention.

For the case in which the half separation $\Delta$ between the two resonance centers is much larger than the resonance linewidth $\gamma$, $\delta\nu_c$ is approximately equal to $2\gamma$ (see FIG. 9b).

In the cases in which $\Delta \gg \gamma$, the working bandwidth is approximately equal to the separation between the two resonances $2\Delta$. Therefore, the working finesse in this case can be approximated by $$F_w \approx \Delta/\gamma. \quad (37)$$

As long as the strength of the resonances is great enough, the working finesse can be very high, linearly proportional to the separation between the two resonance centers (see FIG. 9c).

C. Electromagnetically Induced Transparency

Electromagnetically induced transparency (EIT) is another slow-light process that can achieve a very large group index. In the case of zero pump detuning (see FIG. 10a), the analytic expression for the complex refractive index of a $\Lambda$-type EIT medium as a function of the frequency detuning $\nu' = \nu - \nu_0$ from the EIT resonance center $\nu_0$ is given by where $\alpha_0$ and $k_0$ are the background absorption coefficient (when the pump field is absent) and the wave number at the EIT center frequency, respectively, $\gamma_{ca}$ and $\gamma_{ba}$ are the dephasing rates of the transitions from levels $|c\rangle$ to $|a\rangle$ and from $|b\rangle$ to $|a\rangle$, respectively, and $\Omega_p$ is the pump Rabi frequency.

For a typical EIT medium with $\gamma_{ba} \gg \gamma_{ca}$, one can expand Equ. [38] in a Taylor series, keep terms up to the third order, and obtain the following approximate expressions for the absorption coefficient and the refractive index near the EIT resonance center (within the transparency window), $$\alpha(v') \approx \frac{\alpha_0}{1+|\overline{\Omega}_p|^2}\left(1+\frac{v'^2}{A^2}\right), \text{ and} \quad (39)$$

$$n(v') \approx 1 + \frac{\alpha_0 c}{4\pi v_0} \frac{Bv'}{1+|\overline{\Omega}_p|^2}\left(1+\frac{v'^2}{C^2}\right). \quad (40)$$

where $\overline{\Omega}_p \equiv \Omega_p/\sqrt{\gamma_{ba}\gamma_{ca}}$ is the normalized pump Rabi frequency, $\overline{\gamma} \equiv \gamma_{ba}/\gamma_{ca}$, $A^2 \equiv \gamma_{ba}^2(1+|\overline{\Omega}_p|^2)^2/[(\overline{\gamma}^2+\overline{\gamma})|\overline{\Omega}_p|^2-1]$, $B \equiv (|\overline{\Omega}_p|^2-\overline{\gamma}^{-1})/[\gamma_{ca}(1+|\overline{\Omega}_p|^2)]$, and $C^2 \equiv \gamma_{ca}\gamma_{ba}(|\overline{\Omega}_p|^2+1)^2(|\overline{\Omega}_p|^2-\overline{\gamma}^{-1})/[|\overline{\Omega}_p|^4-(3\overline{\gamma}^{-1}+\overline{\gamma}+2)|\overline{\Omega}_p|^2+\overline{\gamma}^{-2}]$.
Using these expressions, one can obtain the following result for the ratio of $\alpha$ to $n'_g$, $$\frac{\alpha(v')}{n'_g(v')} = \frac{4\pi C^2}{cBA^2}\frac{(A^2+v'^2)}{(C^2+3v'^2)}. \quad (42)$$

At the EIT resonance center (i.e. $v'=0$), one obtains the following expression for the characteristic spectral resolution.

$$\delta v_c(v'=0) = \left|\frac{c\alpha(0)}{2\pi n'_g(0)}\right| = \frac{2}{B} = 2\gamma_{ca}\frac{|\overline{\Omega}_p|^2+1}{|\overline{\Omega}_p|^2-\overline{\gamma}^{-1}}. \quad (43)$$

As the pump Rabi frequency increases, the characteristic spectral resolution approaches its minimum value $\delta v_c \rightarrow 2\gamma_{ca}$. Note that this resolution is much finer than the intrinsic linewidth $\gamma_{ba}$ associated with the transition from level $|b\rangle$ to $|a\rangle$.

One sees from Eq. (42) that the resolution $\delta v_c$ will deteriorate as the signal frequency is detuned away from the EIT resonance center. The working bandwidth $\Delta v_w$ is determined through the relation that the resolution at the boundary $\delta v_c$ ($v'=0.5\Delta v_w$) of the working bandwidth is twice as large as the resolution at the EIT resonance center, i.e., $$\frac{A^2+(0.5\Delta v_w)^2}{C^2+3(0.5\Delta v_w)^2} = 2\frac{A^2}{C^2}. \quad (44)$$

For a large pump Rabi frequency, one obtains the following expression for the working bandwidth, $$\Delta v_w = 2\sqrt{\frac{A^2C^2}{C^2-6A^2}} \approx \frac{2\gamma_{ba}|\overline{\Omega}_p|}{\sqrt{\overline{\gamma}(\overline{\gamma}-5)}}. \quad (45)$$

Since $\gamma_{ba} \gg \gamma_{ca}$ (i.e., $\gamma_{bar} \gg 1$), the working bandwidth can be further approximated as $\Delta v_w \approx 2\gamma_{ca}|\Omega_{bar,p}|$. Consequently, the working finesse $F_w$ is given by For a large pump Rabi frequency and a large $\gamma_{bar}$, the working finesse becomes $F_w \approx |\Omega_{bar,p}|$, i.e., the normalized pump Rabi frequency.

Figure 10:
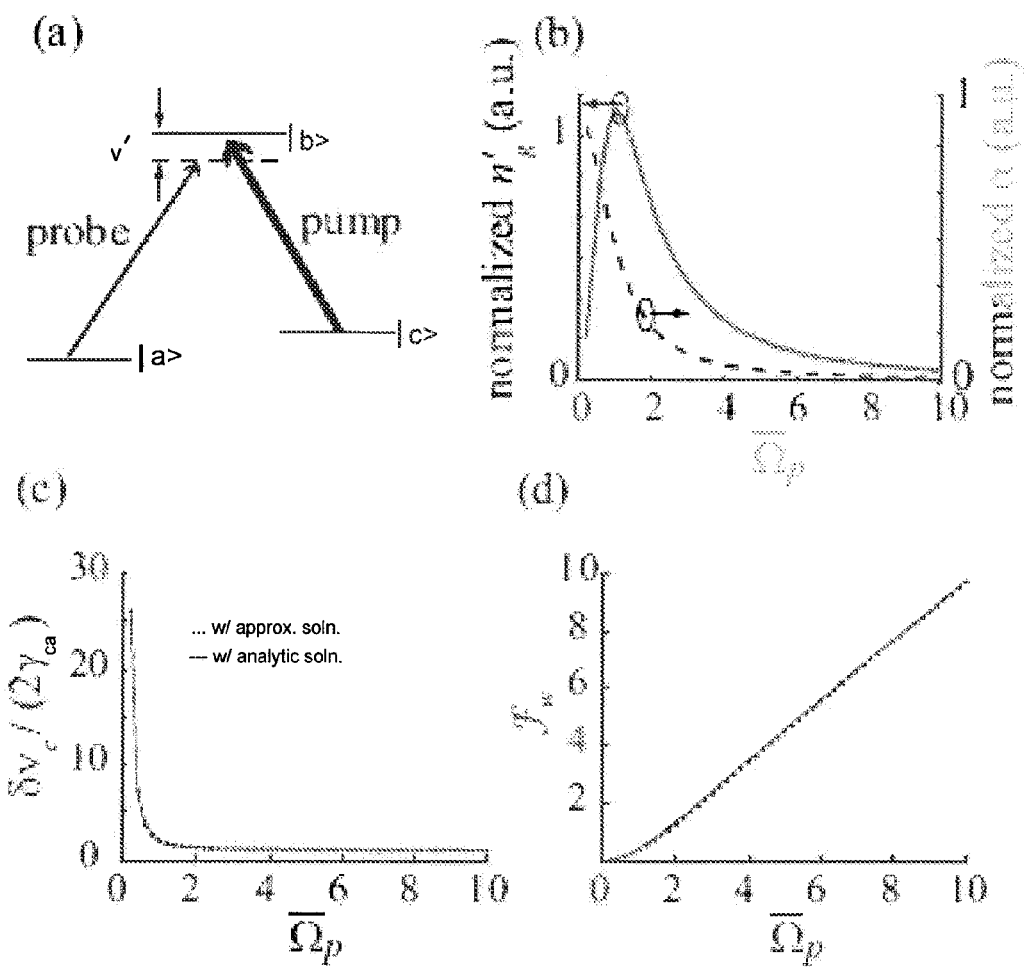
FIG. 10a shows an energy level diagram of a Λ-type (i.e., two ground states and one excited state) EIT system.
FIG. 10b graphically shows the relative group index and absorption coefficient at the center frequency.
FIG. 10c graphically shows the characteristic spectral resolution at a value $v_0=0$.
FIG. 10d graphically shows the working finesse, all plotted as functions of the normalized pump Rabi frequency for an EIT medium with $\gamma_{bar}=100$, where the dots are results using approximated expressions and the solid lines are results based on analytical expressions, according to an illustrative aspect of the invention.

FIG. 10b shows the normalized relative group index and the absorption coefficient at the EIT resonance center as the normalized pump Rabi frequency $\Omega_{bar,p}$ increases. One sees that the group index reaches its maximum when $\Omega_{bar,p}$ is approximately equal to 1. For $\Omega_{bar,p} > 1$, the value of the group index decreases due to the power broadening of the transparency window. Meanwhile, the absorption coefficient decreases monotonically as $\Omega_{bar,p}$ increases. As a result, the characteristic spectral resolution $\delta v_c$ rapidly becomes smaller first as $\Omega_{bar,p}$ increases from zero, and gradually approaches its theoretical limit $2\gamma_{ca}$ for $\Omega_{bar,p} > 2$ (see FIG. 10c). On the other hand, one sees from FIG. 10d that the working finesse is approximately equal to the value of the normalized Rabi frequency $\Omega_{bar,p}$ as predicted in Equ. [46].

The spectral performance of various types of slow-light interferometers has been described under the practical situations in which the slow-light medium has associated gain or absorption and dispersion of the group index. Under practical conditions the actual spectral resolution of the interferometer is primarily limited by the ratio between the associated gain or loss and the group index, and the working bandwidth is limited by the frequency dependence of this ratio.

The spectral performance of slow light interferometers using three specific, illustrative slow light processes has been described in terms of the characteristic spectral resolution and the working finesse. While the characteristic resolution is typically limited by the linewidth of a resonance-induced slow-light medium, it can be much smaller if a broad band absorption or gain can be added on the narrow gain or absorption feature to make the slow-light medium more transparent over the spectral region for which the group index is large. Moreover, it has been shown that there is no fundamental upper limit for the working finesse that a slow light interferometer can achieve. The foregoing analyses thus provide guidelines for how to choose appropriate slow-light techniques for interferometry applications to meet specific demands on the spectral performance thereof.

Having thus described the various embodiments of the invention, it will be apparent to those skilled in the art that the foregoing detailed disclosure is presented by way of example only and thus is not limiting. Various alterations, improvements and modifications recognized by those skilled in the art, though not expressly stated herein, may be made and are intended to be within the spirit and scope of the claimed invention. Additionally, the recited order of processing elements or sequences, or the use of numbers, letters, or other designations, is not intended to limit the claimed processes to any order except as may be specified in the claims. Accordingly, embodiments of the invention are limited only by the following claims and equivalents thereto.

We claim:

1. A spectroscopic parameter detection and/or measurement apparatus, comprising:
   means for optically generating at least two parts of an input electromagnetic (EM) field and generating an output field;
   a highly optically dispersive medium capable of supporting one of a slow-light and a fast-light optical phenomenon cooperatively engaged with said means; and
   an output field detector component disposed along an output field propagation path of the apparatus.

2. The apparatus of claim 1, wherein said means is a two-beam interferometer including an input field divider, a first arm providing a first input field propagation path, a second arm providing a second input field propagation path, an optical path length compensator disposed in at least one of the first and second propagation paths, and an input field combiner, wherein the highly dispersive medium is disposed in at least one of the first and second propagation paths.

3. The apparatus of claim 1, wherein said means is a Mach-Zehnder interferometer.

4. The apparatus of claim 3, wherein the highly dispersive medium is a slow-light medium.

5. The apparatus of claim 1, wherein said means is a Michelson interferometer.

6. The apparatus of claim 5, wherein the highly dispersive medium is a slow-light medium.

7. The apparatus of claim 1, wherein said means is a Twyman-Green interferometer.

8. The apparatus of claim 7, wherein the highly dispersive medium is a slow-light medium.

9. The apparatus of claim 1, wherein the highly dispersive medium comprises a plurality of optically dispersive media including at least one highly optically dispersive medium.

10. The apparatus of claim 1, wherein the highly dispersive medium is characterized by a group index of refraction, $n_g$, where the absolute value of $n_g$ is equal to or greater than four.

11. The apparatus of claim 1, wherein the highly dispersive medium is in the form of an atomic vapor.

12. The apparatus of claim 1, wherein the highly dispersive medium is in the form of a wave-guiding fiber.

13. The apparatus of claim 1, wherein the highly dispersive medium is in the form of a microstructure fiber.

14. The apparatus of claim 1, wherein the highly dispersive medium is in the form of a solid media.

15. The apparatus of claim 1, wherein the highly dispersive medium is in the form of an integrated lightwave structure.

16. The apparatus of claim 1, wherein the highly dispersive medium is in the form of a liquid medium.

17. The apparatus of claim 1, wherein the highly dispersive medium is in the form of a meta-material.

18. The apparatus of claim 1, wherein the highly dispersive medium is in the form of a condensate.

19. The apparatus of claim 1, wherein said means is a multiple-beam interferometer.

20. The apparatus of claim 19, further comprising an output field imaging system disposed intermediate the highly dispersive medium and the detector component.

21. The apparatus of claim 19, wherein said means is a Fabry-Perot interferometer.

22. The apparatus of claim 21, wherein the highly dispersive medium is a slow-light medium.

23. The apparatus of claim 19, wherein said means is a wedged shear interferometer.

24. The apparatus of claim 23, wherein the highly dispersive medium is a slow-light medium.

25. The apparatus of claim 1, wherein said means comprises a diffraction grating.

26. The apparatus of claim 25, wherein the highly dispersive medium is disposed intermediate an exit surface of the diffraction grating and the detector component.

27. The apparatus of claim 25, wherein the highly dispersive medium is a slow-light medium.

28. The apparatus of claim 25, wherein the diffraction grating is a transmission grating.

29. The apparatus of claim 25, wherein the diffraction grating is a reflection grating.

30. The apparatus of claim 25, comprising a plurality of diffraction gratings.

31. The apparatus of claim 25, wherein the diffraction grating is a non-periodic grating.

32. The apparatus of claim 1, wherein the apparatus is a spectroscopic interferometer.

33. The apparatus of claim 1, wherein the apparatus is a wavelength shift-measuring apparatus.

34. The apparatus of claim 1, wherein the apparatus is a frequency shift-measuring apparatus.

35. The apparatus of claim 1, wherein the apparatus is a tunable filter.

36. The apparatus of claim 1, wherein the apparatus is a wavelength division multiplexer.

37. An improved two-beam spectroscopic interferometer, comprising a highly optically dispersive medium disposed in at least one input field propagation path of the interferometer.

38. The interferometer of claim 37, wherein the highly optically dispersive medium is a slow-light medium characterized by a group index of refraction having a value that is equal to or greater than four.

39. The interferometer of claim 37, wherein the highly optically dispersive medium is a fast-light medium characterized by a group index of refraction having a value that is equal to or less than negative four.

40. An improved multi-beam spectroscopic interferometer, comprising a highly optically dispersive medium disposed in an input field propagation path of the interferometer.

41. The interferometer of claim 40, wherein the highly optically dispersive medium is a slow-light medium characterized by a group index of refraction having a value that is equal to or greater than four.

42. The interferometer of claim 40, wherein the highly optically dispersive medium is a fast-light medium characterized by a group index of refraction having a value that is equal to or less than negative four.

43. The interferometer of claim 40, comprising a Fabry-Perot etalon.

44. The interferometer of claim 40, comprising a wedge-plate.

45. The interferometer of claim 40, comprising a curved surface.

46. A method for measuring a spectroscopic parameter of an EM input field, comprising:
propagating the EM input field through a spectroscopic parameter measuring apparatus that includes a highly dispersive medium disposed in a propagation path of at least an optical component of the input field; and
detecting an EM output field generated by the interaction of the EM input field with the highly dispersive medium, wherein said output field presents an indicia of the spectroscopic parameter to be measured.

47. The method of claim 46, comprising detecting an indicia of spectral resolution.

48. The method of claim 46, comprising detecting an indicia of spectral bandwidth.

49. The method of claim 46, comprising detecting an indicia of finesse.

* * * * *